US005628296A

United States Patent [19]

Herrington et al.

[11] Patent Number: 5,628,296

[45] Date of Patent: May 13, 1997

[54] TEMPERATURE-COMPENSATED EXHAUST GAS RECIRCULATION SYSTEM

[75] Inventors: Thomas Herrington; Michael J. Covey, both of Dixon, Ill.

[73] Assignee: Borg-Warner Automotive, Inc., Sterling Heights, Mich.

[21] Appl. No.: 586,584

[22] Filed: Jan. 16, 1996

[51] Int. Cl.[6] .......... F02M 25/07; F16K 31/02

[52] U.S. Cl. .......... 123/571; 251/129.15; 335/217; 335/219

[58] Field of Search .......... 123/478, 484, 123/490, 520, 568, 569, 571; 251/129.01, 129.15; 236/49.3; 361/152, 154; 335/216, 217, 219, 220, 236, 237, 255

[56] References Cited

U.S. PATENT DOCUMENTS

| | | | |
|---|---|---|---|
| 3,625,476 | 12/1971 | Meier | 251/129.01 |
| 4,168,756 | 9/1979 | Enzmann et al. | 335/217 |
| 4,240,580 | 12/1980 | Fehr | 236/49.3 |
| 4,348,710 | 9/1982 | Woods | 335/216 |
| 4,522,371 | 6/1985 | Fox et al. | 251/139 |
| 4,556,926 | 12/1985 | Yanagida | 361/154 |
| 4,805,582 | 2/1989 | Braun et al. | 123/568 |
| 4,944,276 | 7/1990 | House et al. | 123/520 |
| 4,961,413 | 10/1990 | Grey et al. | 123/571 |
| 4,986,246 | 1/1991 | Kessler de Vivie et al. | 123/520 |
| 5,094,218 | 3/1992 | Everingham et al. | 123/571 |
| 5,237,980 | 8/1993 | Gillier | 123/520 |
| 5,263,439 | 11/1993 | Doherty et al. | 123/484 |
| 5,460,146 | 10/1995 | Frankenberg | 123/571 |
| 5,494,255 | 2/1996 | Pearson et al. | 123/571 |

FOREIGN PATENT DOCUMENTS

| | | |
|---|---|---|
| 4205563 | 8/1993 | Germany . |
| 4308479 | 9/1993 | Germany . |

OTHER PUBLICATIONS

Standard NTC Thermistor Applications (Ketema, Rodan Division) (no date given).

*Primary Examiner*—Willis R. Wolfe

*Attorney, Agent, or Firm*—Reising Ethington et al.; Greg Dziegielewski

[57] ABSTRACT

A solenoid exhaust gas recirculation (EGR) valve (12) includes a first inductive coil (48) that generates a magnetic field when energized by a signal from a control unit (13). The magnetic field drives a ferromagnetic armature valve (64) open and closed—metering the flow of recovered exhaust gases from an engine exhaust manifold (14) to an engine air intake manifold (16). The exhaust gas flow rate depends upon the amount of current flowing through the first coil (48). The resistance of the first coil (48) is temperature-dependent. Therefore, to reduce changes in coil current and magnetic field strength due to temperature changes, the first coil (48) is connected in series with a thermistor (75) having a temperature coefficient of resistance that is opposite that of the first coil (48). A temperature stable resistor in the form of a second coil (72) is connected across the thermistor (75) to modify the thermistor temperature-response curve to more closely offset that of the first coil (48). The second coil (72) may be disposed adjacent the first coil (48) to generate a magnetic field opposite that of the first coil (48). The opposing field reduces residual magnetism causing the valve (12) to respond to control inputs more positively.

9 Claims, 2 Drawing Sheets

TEMPERATURE-COMPENSATED EXHAUST GAS RECIRCULATION SYSTEM

TECHNICAL FIELD

This invention relates to solenoid-actuated exhaust gas recirculation (EGR) valves for automotive vehicle engines.

BACKGROUND OF THE INVENTION

Exhaust gas recirculation (EGR) systems reduce automotive vehicle engine emissions by recirculating exhaust gases from the engine exhaust manifold into the engine combustion chambers to be re-burned. The re-burning results in more complete fuel combustion and fewer hydrocarbon emissions.

EGR systems of this type may be either electronic or electro-pneumatic. Electronic EGR systems include electronic control units that control the rate of exhaust gas recirculation by sending an electric control signal directly to an electrically-actuated EGR valve. In electro-pneumatic systems the electronic control unit sends its control signal to an electro-pneumatic solenoid valve that sends corresponding pneumatic signals to a pneumatic EGR valve. The electronic control units for both types of system calculate the optimum recirculation rate based on a given set of operating variables.

Electrically-actuated EGR valves sometimes use solenoids to control valve position. An electronic control unit controls valve position in a solenoid EGR valve of this type by varying the voltage or current of a non-oscillatory electrical input signal or by modulating the pulse-width of a fixed-frequency modulated (PWM) signal.

Solenoid EGR valves include inductive coils that generate magnetic fields when energized. The magnetic field of a typical solenoid valve drives a ferromagnetic armature valve between open and closed positions to meter exhaust gas flow. In a system using a non-oscillatory control signal, the exhaust gas flow rate is proportional to the current passing through the coil. In PWM-type systems, the valve opens and closes at the frequency of the electrical input signal with the exhaust gas flow rate being proportional to the signal pulse width.

The inductive coil in a solenoid EGR valve includes windings of electrically conductive wire, typically copper. The coil wire resistance changes with temperature. The supply voltage, e.g., battery voltage, used to derive the pulse train or non-oscillatory drive signal for the coil is relatively temperature-independent. Thus, any increase in coil wire resistance will result in a proportional decrease in electric current passing through the coil. Likewise, any decrease in coil wire resistance will result in a proportional increase in electric current passing through the coil. Changes in current through the coil change the magnetic field strength. Changes in magnetic field strength change the exhaust gas flow rate through the EGR valve. Therefore, as the temperature of the coil changes, the exhaust gas flow rate changes accordingly.

It is desirable for a solenoid EGR valve to include some means to compensate for changes in coil resistance that result from temperature changes. Current solenoid EGR valves, such as those disclosed in U.S. Pat. Nos. 5,094,218; 4,961,413 and 4,805,582 do not compensate for temperature changes.

The prior art does, however, include EGR systems having temperature-compensated electro-pneumatic converters with proportional solenoid valves that regulate vacuum pressure to vacuum-actuated EGR valves. For example, U.S. Pat. No. 4,522,371 to Fox et al., issued Jun. 11, 1985, (the Fox et al. patent) discloses an electro-pneumatic converter with a proportional solenoid valve that is electronically-controlled and compensates for temperature changes by modifying the control signal. The Fox et al. system includes a proportional solenoid valve with an inductive coil that, when energized, produces a magnetic field. An armature in the form of an annular magnetic closure member is disposed adjacent the coil and is movable under the influence of the magnetic field to adjust the vacuum pressure output of the solenoid valve. The inductive coil has a coil resistance value that varies with temperature. The magnetic field is controlled by a pulse-width-modulated control signal from an electronic control unit. In response to elevated ambient temperatures, the control unit increases the control signal duty cycle to compensate for the changed temperature condition (see column 8, lines 17–19).

To compensate for temperature-induced coil resistance changes by modifying the control signal in this way, an electro-pneumatic converter must include at least one remote sensor to measure ambient air temperature. A microprocessor or other logic device must receive inputs from the temperature sensor and be programmed to change the duty cycle or otherwise adjust the control signal it sends to the proportional solenoid valve to maintain the output vacuum pressure at a predetermined optimum value for a given set of operating variables.

Designing and manufacturing EGR systems that compensate for temperature changes by modifying the control signal involves considerable time and expense. For example, the addition of a temperature sensor requires the purchase of the sensor and connecting wire, wiring harness modifications and involves additional steps in an assembly-line process. In addition, a microprocessor must be purchased and programmed or an existing electronic control unit must be modified to process information from the temperature sensor.

An example of an electro-pneumatic EGR system that compensates for temperature without modifying the control signal is disclosed in U.S. Ser. No. 08/425,402, (the '402 application), currently pending in the U.S. Patent and Trademark Office and assigned to the assignee of this invention. The electro-pneumatic converter disclosed in the '402 application includes an inductive coil that generates a magnetic field when energized. An electronic control unit energizes the coil with a fixed-frequency pulse-width modulated signal. The periodic magnetic field drives a ferromagnetic armature valve open and closed—alternately admitting then closing-off a flow of atmospheric-pressure air that is used to alter the vacuum pressure output to the EGR valve. The vacuum pressure is dependent upon the amount of current flowing through the coil during each pulse. The coil resistance is temperature-dependent. To hold the coil current constant over temperature, the coil is connected in series with a thermistor having a temperature coefficient of resistance that is opposite that of the coil. A temperature-stable resistor is connected across the thermistor to modify its temperature-response curve to more closely offset that of the coil. This system achieves temperature compensation without modifying the control signal to the coil but requires a vacuum source and an electro-pneumatic solenoid valve that converts electrical signals from the control unit into pneumatic signals for operating the EGR valve.

What is needed is an EGR system that compensates for temperature changes without modifying the control signal, that includes fewer components, and that does not require a vacuum source to operate its EGR valve.

SUMMARY OF THE INVENTION AND ADVANTAGES

The present invention provides an exhaust gas recirculation (EGR) valve 12 of the type that is connected between an engine exhaust manifold 14 and an engine air intake manifold 16 and is electrically actuable to control exhaust gas flow from the exhaust manifold 14 to the air intake manifold 16. Characterizing the invention is a first inductive coil 48, a ferromagnetic armature 62 and a resistive combination of circuit elements 74. The first inductive coil 48 includes a number of turns of an electrical conductor, whereby the first coil 48 produces a magnetic field when energized. The electrical conductor has a positive temperature coefficient of resistance. The ferromagnetic armature is disposed adjacent the first coil 48 and is movable under the influence of the magnetic field to regulate the flow rate of the exhaust gas through the EGR valve 12. The resistive combination of circuit elements 74 is connected in series with the first coil 48. The resistive combination of circuit elements 74 includes a first resistive element and a second resistive element 72 connected across the first resistive element 75. The first resistive element 75 has a temperature-dependent range of resistance values and a negative temperature coefficient of resistance and the second resistive element 72 has a resistance value. The resistive combination of circuit elements 74 has a range of resistance values that exhibits a preselected negative temperature characteristic whereby the variation in resistance seen across the series connection of the first coil 48 and the resistive combination 76 due to temperature changes is less than the variation in resistance of the first coil 48 alone due to the temperature changes.

The present invention is different from EGR valves in prior art temperature-compensated EGR systems in that it does not operate in response to pneumatic signals. Power for operating an EGR valve constructed according to the invention comes solely through the controller from an electrical power supply, e.g., an automobile battery instead of a typically non-constant vehicle vacuum pressure system. Therefore, an EGR valve constructed according to the present invention needs no electro-pneumatic converter to convert electrical signals into pneumatic signals, no vacuum hoses, and provides positive EGR valve control without needing special features to compensate for variations in vehicle vacuum pressure. Moreover, with the present invention there is also no control delay due to gas compressibility factors associated with pneumatically-driven control systems.

The present invention is also different from EGR valves found in prior art EGR systems that rely on control signal modifications to compensate for ambient temperature changes. An EGR valve according to the present invention requires fewer components to operate it. It does not require the feedback sensors or connecting wires that would otherwise be needed to provide information to a microprocessor-based electronic control unit.

BRIEF DESCRIPTION OF THE DRAWINGS

To better understand and appreciate the advantages of this invention, please refer to the following detailed description in connection with the accompanying drawings. In the drawings.

DETAILED DESCRIPTION OF THE PREFERRED EMBODIMENT

Figure 1:
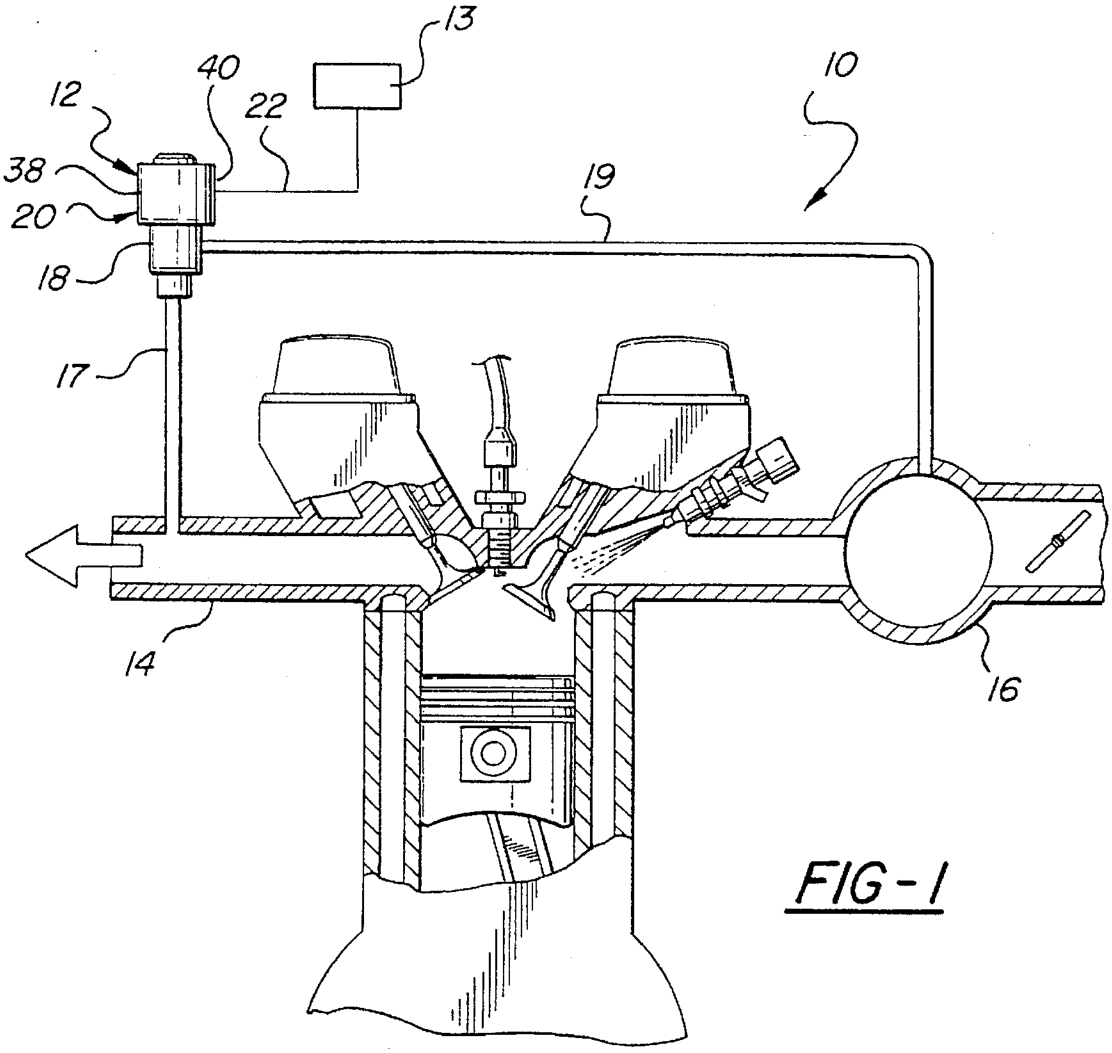
FIG. 1 is a schematic representation of an exhaust gas recirculation system including an EGR valve according to the present invention.

A solenoid exhaust gas recirculation (EGR) system is schematically shown at 10 in FIG. 1 as it would be installed on an automotive engine. The EGR system 10 includes an electrically-actuated solenoid EGR valve, generally indicated at 12 in FIGS. 1 and 2, and a control unit 13 for generating and sending an electronic control signal to the EGR valve 12. As shown in FIG. 1, the solenoid EGR valve 12 is connected between an engine exhaust manifold 14 and an engine air intake manifold 16 and controls a flow of exhaust gases recirculating from the exhaust manifold 14 back to the air intake manifold 16. An exhaust hose 17 delivers the exhaust gases from the exhaust manifold 14 to the solenoid EGR valve 12. An air intake hose 19 receives exhaust gases from the solenoid EGR valve 12 and delivers them to the air intake manifold 16. A pair of electrical wires, schematically represented by line 22 in FIG. 1, transmit a pulse-width-modulated electrical signal from the control unit 13 to the valve 12. The electrical signal commands the solenoid EGR valve 12 to move to a fully open position, a fully-closed position, or an intermediate position between fully open and closed. The EGR valve 12 position determines the exhaust gas recirculation rate.

Figure 2:
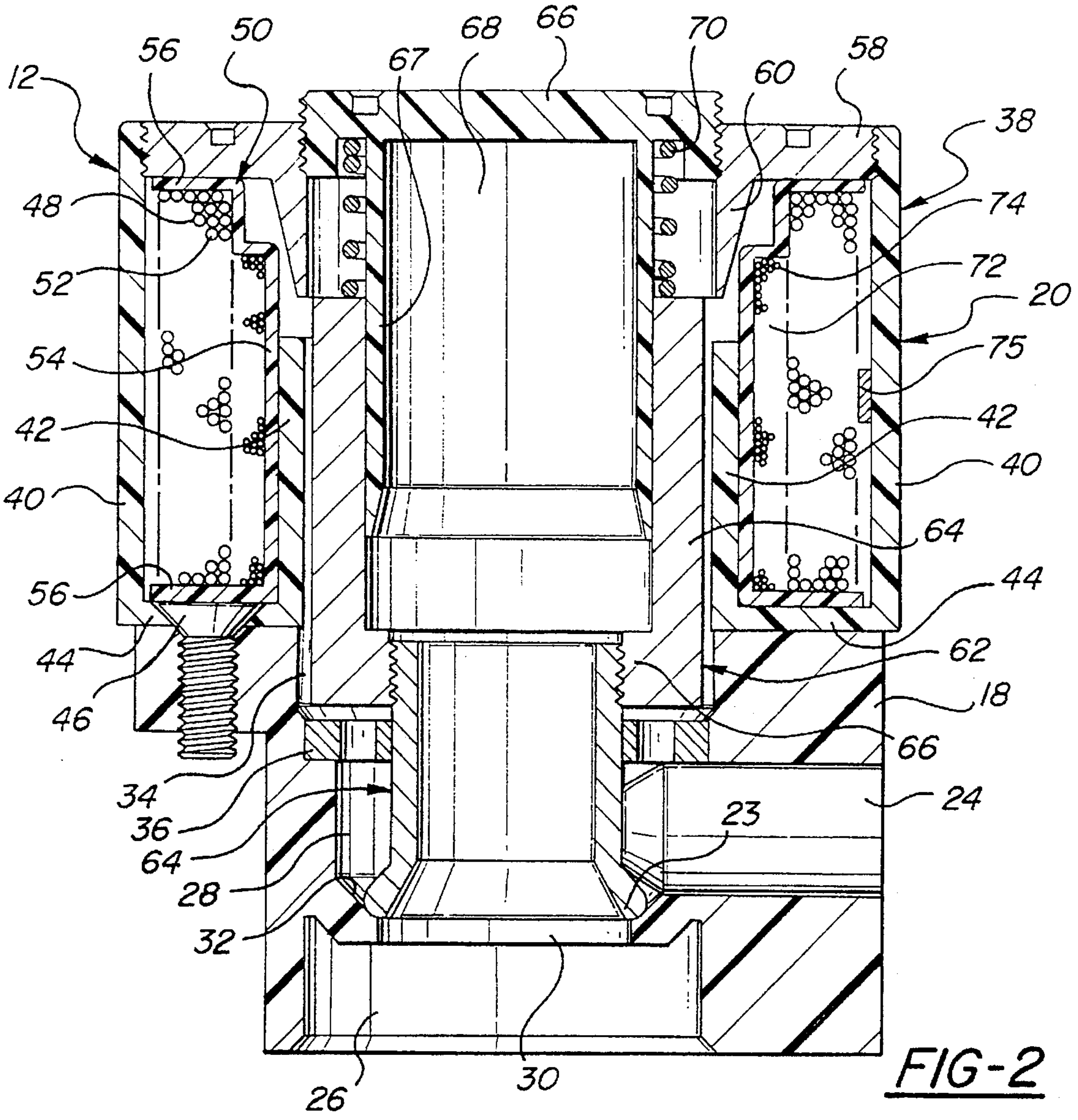
FIG. 2 is a cross-sectional front view of the solenoid EGR valve shown in FIG. 1.

As is best shown in FIG. 2, the solenoid EGR valve 12 comprises a plastic valve body 18 and a solenoid assembly 20 that is attached to the valve body 18. The solenoid assembly 20 operates a moveable valve head 23 so as to control exhaust gas flow through the valve body 18.

The valve body 18 comprises an outlet conduit 24 that intersects a central chamber 28 inside the valve body 18 and is adapted to receive one end of the hose 19 leading to the air intake 16. An inlet conduit 26 communicates with the central chamber 28 via a restricted opening 30 and is adapted to receive one end of the hose 17 leading to the exhaust manifold 14. A conical valve seat 32 surrounds the restricted opening 30 on the outlet side of the opening 30. The valve seat 32 cooperates with the valve head 23 to control exhaust gas flow through the restricted opening 30. The valve head 23 engages the valve seat 32 as shown in FIG. 2 to block exhaust gas flow through the restricted opening 30 and is raised above the valve seat 32 from the position shown in FIG. 2 to allow exhaust gases to flow through the restricted opening 30.

The valve body 18 further includes an enlarged chamber 34 that is concentric with the restricted opening 30. The enlarged chamber 34 has an open top that is closed when the solenoid assembly 20 is attached to the valve body 18 as shown in FIG. 2. A bearing plate 36 is press fit into the bottom of the enlarged chamber 34 for guiding reciprocating movement of the valve head 23.

With continued reference to FIG. 2, the solenoid assembly 20 comprises a cup-shaped plastic housing 38 having an outer housing cylinder 40 and an inner housing cylinder 42 coaxially disposed and integrally connected at their respective bottom edges by an annular housing flange 44. The inner housing cylinder 42 rises to approximately half the height of the outer housing cylinder 40 from the annular flange 44. Screw fasteners 46 attach the annular housing flange 44—and therefore the entire solenoid assembly 20—to the top of the valve body 18.

The solenoid assembly 20 includes a first inductive coil 48 that comprises a plastic spool 50 and a coil wire 52 of copper or other suitable electrically conductive material that is wound on a hollow spool shaft 54 between two end plates 56. The hollow spool shaft 54 fits around the inner housing cylinder 42 which extends about half-way up the hollow spool shaft 54. The spool 50 is seated on the upper surface of the housing annular flange 44.

The solenoid assembly 20 has an annular cover 58 that is screwed into the open upper end of the outer housing cylinder 40. The annular cover 58 has an inner annular cover flange 60 with an inner diameter approximately the same as that of the inner housing cylinder 42. The inner annular cover flange 60 is concentrically disposed above the inner housing cylinder 42 and extends part way down into the hollow spool 50 of the first coil 48 to a point spaced above the upper end of the inner housing cylinder 42. The outer surface of the inner annular cover flange 60 is tapered to facilitate annular cover 58 assembly. The annular cover 58 is made of a ferromagnetic material such as soft iron, etc., so that the annular cover 58 and its inner annular flange 60 together act as a pole piece.

The solenoid assembly 20 further comprises a ferromagnetic armature 62 that is slidably disposed in the inner housing cylinder 42. The armature 62 has a hollow cylindrical body with a bottom wall that is bored and threaded. The valve head 23 is a hollow tube that has a threaded upper end and a flared lower end. The threaded upper end is screwed into the threaded bore of the armature 62 to attach the valve head 23 to the armature 62 forming a ferromagnetic armature valve 64. The flared lower end of the valve head 23 is shaped to engage the valve seat 32 and close the EGR valve 12 as shown in FIG. 2.

Because the inner diameter of the inner housing cylinder 42 and the cover flange 60 are substantially the same, the upper end of the armature valve 64 is able to reciprocate upward past the inner housing cylinder 42 and into the annular cover flange 60.

The solenoid assembly 20 further includes a threaded cap 66 that is screwed into the upper end of the hole in the annular cover 58. The threaded cap 66 has a hollow stem 67. The lower end of the hollow stem fits inside the upper end of the armature 62 with a sliding fit to form an expandable chamber 68. The expandable chamber 68 is fluidly connected with the inlet 26 of the valve body 18 via the hollow valve head 23.

The solenoid assembly 20 also includes a return spring in the form of a coil spring 70 that surrounds the upper end of the hollow cap stem 67. The coil spring 70 engages the top of the armature 62 and pushes the armature valve 64 downwardly away from the cap 66 toward the valve body 18.

As is best shown in FIG. 2, the solenoid valve 12 includes a second inductive coil 72 concentrically disposed inside the first inductive coil 48. For reasons described below, the second coil 72 has electrically conductive wire windings 74 that are wound opposite those of the first coil 48 to produce a magnetic field opposing that of the first coil 48. The armature valve 64 is slidably disposed through the common center of both concentric coils 48, 72 and moves under the influence of both magnetic fields. Because, as is described above, the armature valve 64 is spring—loaded, when the coils 48, 72 are de-energized the armature valve 64 moves to a closed position halting exhaust gas flow through the valve 12. When the coils 48, 72 are energized, the first magnetic field over-powers the second magnetic field and the return spring 70 pulls the armature valve 64 away from the closed position opening the restricted opening 30 and allowing the exhaust gas to flow through. The armature valve 64 moves between the closed position and a fully-open position to create a restricted opening 30 size proportional to the strength of the electrical signal from the control unit 13. Therefore, the exhaust gas recirculation rate is determined directly by the size of the restricted opening 30 and indirectly by the electrical signal strength.

The control unit 13 meters the electrical signal strength by modulating the pulse width of the electrical input waveform. In other words the electronic control unit 13 controls the rate at which exhaust gases pass through the armature valve 64 by modulating the waveform pulse width of the electrical control signal.

The nominal controlling electrical signal from the electronic control unit 13 comprises a pulse-width modulated waveform with a magnitude of 13.5 V (maximum current of 1000 mA) and a frequency of 140 Hz.

When uncommanded changes in current through the first coil 48 cause the exhaust gas flow rate to deviate from an optimum value, fuel burn becomes less complete and pollutant discharge levels increase. Therefore, current through the first coil 48 must be carefully regulated.

One source of uncommanded changes in current through the first coil 48 is a change in temperature. As described above, the first inductive coil 48 comprises a number of turns of an electrical conductor 52. A coil of this type has a wire/coil resistance value that varies with temperature. In the case of copper wire, as the temperature of the coil wire 52 increases it causes the coil resistance value to increase which decreases the current through the first coil 48. In other words, the first inductive coil 48 has a positive temperature coefficient of resistance that results in less coil current and lower electromagnetic field strength with increasing temperature.

Figure 3:
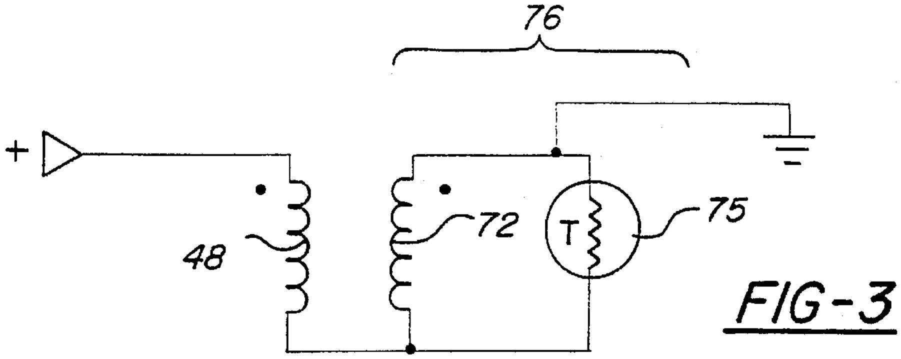
FIG. 3 is a circuit diagram of the electrical components of the solenoid EGR valve of FIG. 2.

To compensate for this temperature dependence and thereby maintain a relatively constant level of current through the first coil 48 during each pulse, a resistive combination of circuit elements is connected in series with the first coil 48. The resistive combination of circuit elements is generally indicated at 76 in FIG. 3. The resistive combination of circuit elements 76 includes a first resistive element in the form of a thermistor 75 connected across the second coil 74. The physical location of the thermistor 75 is shown in FIG. 2. The thermistor 75 has a negative temperature coefficient of resistance and a resulting range of temperature-dependent resistance values that can be represented by a thermistor temperature-response curve. The second coil 72 serves as a second resistive element and has a second coil resistance value. The second coil resistance value modifies the thermistor 75 temperature-response curve so that the parallel combination of the thermistor 75 and the second coil 72 more closely offset the temperature-response curve of the first coil 48.

The resistive combination of circuit elements 76 exhibit a preselected negative temperature characteristic. Therefore, the variation in resistance seen across the series connection of the first coil 48 and the resistive combination 76 due to temperature changes is less than the variation in resistance of the first coil 48 alone due to the temperature changes. In other words, the first coil 48 and the combination of circuit elements 76 have an overall combined range of resistance values that is less temperature-dependent than the first coil resistance value alone.

The resistance value of the second coil 72, is preselected in accordance with the temperature-response curve of the thermistor 75, the thermistor 75 temperature coefficient of resistance, and the first coil 48 temperature coefficient of resistance. The preselected negative temperature characteristic of the resistive combination 76 offsets the positive temperature coefficient of resistance of the first coil 48. Thus, the series connection of the first coil 48 and the resistive combination 76 forms an electronic circuit that exhibits a resistance that is substantially temperature independent. As a result, the current through the first coil 48 remains substantially constant across a wide range of temperatures.

The first coil 48 can be made of 900 turns of 26.5 gauge copper wire with a resistance value of 8.6 ohms at 25 degrees C. The second coil 72 can be made of 100 turns of 23 gauge copper wire with a resistance value of 8.5 ohms at 25 degrees C. The thermistor 75 can have a nominal resistance of 15.0 ohms at 25 degrees C. The thermistor 75 can be a SURGE-GARD™ disc thermistor 75, part number SG13, manufactured by Katema, Rodan Division.

This gives the electronic circuit a nominal resistance at twenty five degrees Celsius of approximately 15.0 ohms with a change in resistance from the nominal resistance of less than ±0.8 ohms over the temperature range of −40 to +200 degrees Celsius. In other applications the electronic circuit may have different nominal resistance values and different resistance variation over a range of temperatures.

In addition to serving as a resistive element, the second inductive coil 72 also serves to counteract the residual magnetic effect of the first coil 48, making the EGR valve 12 more responsive to changes in control signal inputs. This arrangement improves EGR valve responsiveness to changing control signals.

To produce an opposing magnetomotive force, the second inductive coil 72 is disposed concentric with and adjacent the first coil 48 with its helical winding 74 wound in a direction opposite that of the first coil 48. The opposing helical windings of the two coils are disposed such that the current passing through the smaller second coil 72 travels in a circumferential direction opposite that of the current passing through the larger first coil 48. The resulting opposing magnetic field of the second coil 72 counters the residual magnetism caused by the stronger magnetic field of the first coil 48.

Where a solenoid EGR valve includes a single coil comprising 800 turns of 25 gauge copper wire, a 1000 mA signal will result in an average residual magnetic force of approximately 1.8 pounds at any point along a 6 and ¾ inch armature stroke. However, where a solenoid EGR valve includes a first coil 48 comprising 900 turns of 26.5 gauge copper wire and a second coil 72 comprising 100 turns of 23 gauge copper wire, a 1000 ma signal will result in an average residual magnetic force of only approximately 1 pound at any point along a 6 and ¾ inch armature stroke.

In other embodiments, the solenoid EGR valve 12 may receive an input control signal from a signal generator or control unit 13 that is non-oscillatory and current or voltage-regulated instead of an oscillatory signal that is pulse-width modulated. In other words, non-oscillatory signal strength is controlled either by regulating the current or voltage rather than a waveform pulse-width.

The solenoid EGR valve 12 may include the resistive combination of circuit elements disclosed in pending U.S. Ser. No. 08/425,402 (the '402 application) and incorporated herein by reference instead of the combination shown in FIG. 3. In place of a second coil 72, the '402 application includes a temperature-stable fixed resistor connected across the thermistor. This circuit would provide temperature compensation but would not counter residual magnetism.

The second coil 72 may comprise a helical winding wound in the same direction as the first coil 48 rather than being wound in the opposite direction as described above. In this case, the second coil 72 is disposed so that the current advancing through the second coil 72 moves in a direction axially opposite and therefore helically opposite the direction of current moving through the first coil 48. So long as the current flow through the second coil 72 runs helically opposite that of the first coil 48, the second coil 72 will produce a magnetic field opposing that of the first coil 48 and compensating for the residual magnetism caused by the first coil 48.

Figure 4:
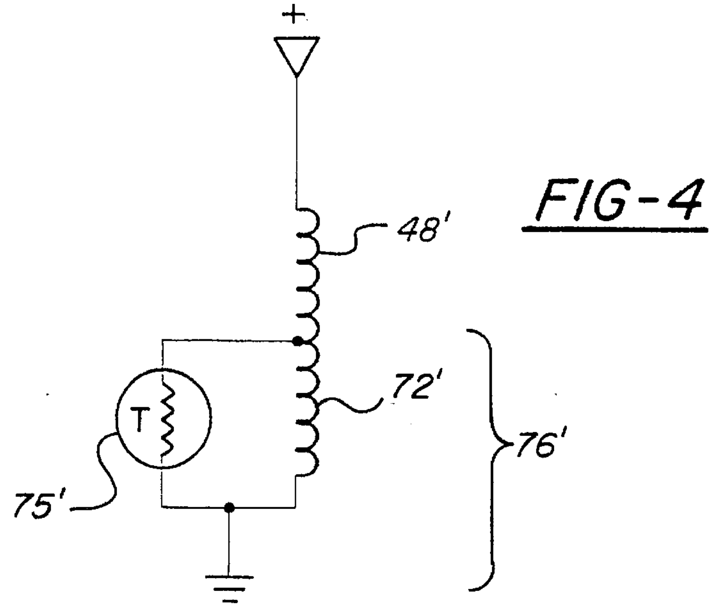
FIG. 4 is a circuit diagram of a second embodiment of the electrical components of the solenoid EGR valve of FIG. 2.

Another possible embodiment of the resistive combination is schematically shown at 76' in FIG. 4. In this embodiment, a thermistor 75' is connected across a portion of a single coil 48', 72' from one end of the coil to a tap location between a first section 48' of the coil and a second section 72' of the coil. Because current runs through the first 48' and second 72' coil sections in the same helical direction, this circuit does not reduce residual magnetism.

This is an illustrative description of the invention using words of description rather than of limitation. Obviously, it is possible to modify this invention in light of the above teachings. Within the scope of the claims, where reference numerals are merely for convenience and are not limiting, one may practice the invention other than as described.

We claim:

1. An exhaust gas recirculation (EGR) valve (12) of the type that is connected between an engine exhaust manifold (14) and an engine air intake manifold (16) and is electrically actuable to control exhaust gas flow from the exhaust manifold (14) to the air intake manifold (16), said EGR valve (12) characterized by:

a first inductive coil (48) including a number of turns of an electrical conductor (52), whereby said first coil (48) produces a magnetic field when energized, said electrical conductor (52) having a positive temperature coefficient of resistance;

a ferromagnetic armature (62) disposed adjacent said first coil (48), said ferromagnetic armature (62) being movable under the influence of the magnetic field to regulate the flow rate of the exhaust gas through said EGR valve (12);

a resistive combination of circuit elements (76) connected in series with said first coil (48), said resistive combination of circuit elements (76) including a first resistive element (75) and a second resistive element (72) connected across said first resistive element (75), said first resistive element (75) having a temperature-dependent range of resistance values and a negative temperature coefficient of resistance and said second resistive element (72) having a resistance value, wherein said resistive combination of circuit elements (76) has a resistance that exhibits a preselected negative temperature characteristic whereby the variation in resistance seen across the series connection of said first coil (48) and said resistive combination (76) due to temperature changes is less than the variation in resistance of said first coil (48) alone due to the temperature changes.

2. An EGR valve (12) as defined in claim 1 wherein said second resistive element (72) comprises a second inductive coil disposed adjacent said first coil (48), said second coil (72) operative to generate a magnetic field opposing that of said first coil (48).

3. An EGR valve (12) as defined in claim 2 wherein said second coil (72) comprises a number of turns of an electrical conductor (74), said second coil conductor (74) wound in a direction helically opposite said first coil conductor (52).

4. An EGR valve (12) as defined in claim 3 wherein said first (48) and second (72) coils are joined end-to-end, said first resistive element (75) being connected across said second coil (72).

5. An EGR valve (12) as defined in claim 2, wherein:

said second coil (72) comprises a number of turns of an electrical conductor (74), said second coil conductor (74) being helically wound in the same direction as said first coil conductor (52), and said second coil (72) is disposed adjacent and parallel said first coil (48) so that, when energized, the current advancing through said second coil (72) moves in a direction helically and axially opposite the direction of current moving through said first coil (48).

6. An EGR valve (12) as defined in claim 1 wherein said resistance value of said second resistive element (72) is preselected in accordance with said range of resistance values and said temperature coefficient of resistance of said first resistive element (75), and said temperature coefficient of resistance of said first coil (48).

7. An EGR valve (12) as defined in claim 1 wherein said preselected negative temperature characteristic of said resistive combination (76) offsets said positive temperature coefficient of resistance of said first coil (48), whereby the series connection of said first coil (48) and said resistive combination (76) forms an electronic circuit that exhibits a resistance that is substantially temperature independent.

8. An EGR valve (12) as defined in claim 7 wherein said electronic circuit has a nominal resistance at twenty five degrees Celsius and exhibits a change in resistance from said nominal resistance of less than ±0.8 ohms over the temperature range of −40 to +200 degrees Celsius.

9. An EGR valve (12) as defined in claim 1 wherein said first resistive element comprises a thermistor (75).

* * * * *